United States Patent Office 3,631,156
Patented Dec. 28, 1971

3,631,156
METHOD FOR PREPARING MIXED ANHYDRIDE-CONTAINING POLYMERS
Walter L. Vaughn, Angleton, and Sherman Kottle, Lake Jackson, Tex., assignors to The Dow Chemical Company, Midland, Mich.
No Drawing. Filed Feb. 9, 1970, Ser. No. 11,364
Int. Cl. C08f 27/00
U.S. Cl. 260—78.4 D                 5 Claims

ABSTRACT OF THE DISCLOSURE

A method for preparing polyalkylene copolymers which contain one or more groups of the formula

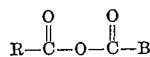

wherein R is an alkyl, aryl, aralkyl, or like group, of up to about 20 carbon atoms, and B is a segment of the polyalkylene chain, the method comprising treating an olefin-carboxylic acid copolymer, which contains at least one group of the formula

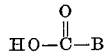

wherein B is as defined above, with an acid anhydride of the formula

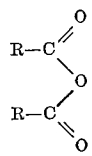

wherein R is as defined above. The resulting co-polymers may be cross-linked to form insoluble films and coatings, and, further, synergistically improve the performance of textile oil- and water-proofing agents.

BACKGROUND OF THE INVENTION

The various precursor polymers utilized in the copolymers prepared by this invention are known to the art, generally being modified or non-modified olefin/acid or olefin/acid halide polymers. They may be made according to a number of U.S. patents, including 3,441,545, 2,268,169, 3,310,518, 3,361,842 and 3,413,272.

They are typically prepared by polymerizing an alpha olefin, such as ethylene and/or propylene, with an alpha, beta ethylenically unsaturated carboxylic acid, in the presence of a catalyst and under superatmospheric pressure. These polymers may then be modified to, for instance, acid halides, esters, amides and the like.

The polymers so made may be utilized as coating and film-forming materials. However, the polymers produced by the instant invention are far more reactive than the above prior art polymers, thereby giving them broader utility.

SUMMARY OF THE INVENTION

The invention is a method for producing polyalkylene copolymers which contain one or more groups of the formula

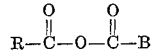 (I)

wherein R is an alkyl, cycloalkyl, aryl, aralkyl, alkaryl, or like group, of up to about 20 carbon atoms, and B is a segment of the polyalkylene chain, the method comprising treating an olefin-carboxylic acid copolymer, which contains at least one group of the formula

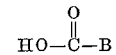 (II)

wherein B is as above defined, with an acid anhydride of the formula

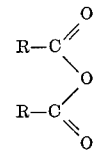 (III)

wherein each R is, independently, as defined above.

The resulting polymers may then be cross-linked to form insoluble and tenacious films and coatings. Further, a synergism is observed with regard to the oil- and water-repellent properties of certain textile agents when combined with the copolymers of this invention.

The copolymers of this invention may suitably have a molecular weight of from about 800 to about 8000, and preferably a molecular weight of from about 1500 to about 4000.

DETAILED DESCRIPTION OF THE INVENTION

The polyalkylene precursor polymers utilized in this invention may suitably be derived from monomers, or mixtures thereof, which are ethylenically unsaturated and polymerizable. These monomers are well known in the art and include such compounds as alkenes and alkadienes, such as ethylene, propylene, butene, isobutene, pentene, hexene, octene, butadiene, isoprene, etc. (the term alkenes is intended to also include cycloalkenes, such as cyclohexene); unsaturated esters, such as acrylate- and methacrylate-containing monomers, such as alkyl and cycloalkyl (1 to 20 carbon atoms) acrylates and methacrylates, such as methyl methacrylate, ethyl acrylate, t-butyl acrylate, 2-ethylhexyl methacrylate, cyclohexyl acrylate and the like; vinyl acetate, vinyl propionate, vinyl butyrate, dimethyl maleate, diethyl maleate, ethyl hydrogen maleate, monoethyl fumarate and diethyl fumarate; nitriles and amides containing unsaturated groups, such as acrylonitrile, methacrylonitrile, acrylamide and methacrylamide; olefinically unsaturated carboxylic acids, such as acrylic acid, methacrylic acid, maleic acid, fumaric acid, itaconic acid and cinnamic acid; and chlorinated and brominated derivatives of the above.

There is the requirement, however, that the monomers used to prepare the precursors polymers of this invention contain at least about 1 to 2 weight percent, preferably about 1 to about 45 weight percent, based on total starting polymer, of one or more monomers which will result in one or more groups pendant from, or terminal to, the polymer back bone, said groups being of Formula II above.

Examples of said monomers include acrylic and methacrylic acids, itaconic acid, maleic acid, fumaric acid, ethyl acid maleate, cinnamic acid, crotonic acid, 3-butenoic acid, 4-pentenoic acid, 3-pentenoic acid, 5-hexenoic acid, 4-hexenoic acid, 3-hexenoic acid, and the like.

The process of this invention, then, may suitably proceed by contacting from about 1.0 to about 80 weight percent (preferably about 20 to 60 weight percent) of the acid-containing polyalkylene copolymer in, optionally, a suitable inert anhydrous solvent, with at least about 1.0 equivalent (preferably 3 to 12 equivalents) of an acid anhydride per polymeric acid equivalent, said reaction to occur at a temperature of from about 10° C. to the boiling point of the anhydride, and preferably at the reflux temperature.

Suitable anhydrides are of Formula III above, wherein each R may be, independently, an alkyl or cycloalkyl group of up to about 20 carbon atoms, such as methyl, i-propyl, amyl, cyclohexyl, octyl, dodecyl, 1-methyl-6,9-ethyl-undecyl, stearyl, and the like; aryls such as phenyl, naphthyl, and the like; and alkaryls and aralkyls of up to about 20 carbon atoms, such as ethylphenyl, naphthylmethyl, phenylhexyl, hexylphenpropyl, diamylphenyl, dibutylnaphthyl, and the like.

Acid anhydrides and mixed anhydrides of the following acids are, for example, suitable; acetic, propionic, butyric, valeric, capric, myristic, oleic, benzoic, toluic, naphthoic, and the like. Preferred anhydrides include acetic, propionic, butyric, valeric and benzoic anhydrides.

Solvents which are suitable in this invention include chlorinated hydrocarbon solvents, such as 1,1,1-trichloroethane, perchloroethylene, ethylene dichloride, methylene chloride, o-dichlorobenzene and the like; other organic solvents, such as benzene, toluene, dioxane, xylene, heptane and higher aliphatics; alkyl acetates; tetrahydrofuran; fluorohalocarbons, such as trichlorofluoromethane, trifluorotrichloroethane, dibromotetrafluoroethane, tetrachlorodifluoroethane, and those fluorohalocarbons which are suitable for use herein for aerosol applications; and mixtures of the above.

Pressure is not a critical variable in the process of this invention, and may suitably be sub-, super- or atmospheric.

The copolymers produced by the process of this invention may suitably form tenacious and solvent resistant films and coatings by thermally curing them, either in solution or in concentrate form, to a temperature at or above the boiling point of the anhydride utilized in their preparation. Details for utilizing the copolymers may be found in co-pending application Ser. No. 11,363, entitled "Reactive Mixed Anhydride-Containing Polymers and a Method for Their Preparation," filed concurrently herewith.

SPECIFIC EMBODIMENTS

Example 1.—Ethylene-acrylic acetic anhydride

A 20 g. portion of ethylene (83.3%)-acrylic acid (16.7%) copolymer (1650 MW) was placed in a one-neck flask fitted with a reflux condenser and drying tube. A 30 ml. portion of acetic anhydride was added and the mixture was refluxed for 3 hours (136–140° C.). The solution was cooled, and the reaction mixture separated into a solid (grease) upper layer and a liquid (acetic anhydride) lower layer. The bottom liquid layer was drained off. The grease was then refluxed with 50 ml. of hexane for 20 minutes and poured into 200 ml. of anhydrous acetone to precipitate the polymer. The excess liquids were decanted and the grease was placed in a flask attached to a roto-evaporator. Volatiles were removed under vacuum. The product was examined by infrared and found to be ethylene-acrylic acetic anhydride. No acrylic acid was found, indicating a quantitative conversion. The product was a clear grease resembling petrolatum in appearance and possessing a pungent odor in damp air.

Example 2.—Ethylene-propylene-acrylic propionic anhydride

A 34 g. portion of ethylene (43.9%) - propylene (40.0%)-acrylic acid (16.3%) interpolymer (950 MW) was combined with 50 ml. of propionic anhydride in a 100 ml. round bottomed flask fitted with a reflux condenser and drying tube. The mixture was refluxed for 3 hours at 169–170° C. The reaction mixture was cooled, diluted with 200 ml. of dry acetone, and the liquids were drained off. The grease was then rinsed with dry acetone to extract residual propionic anhydride. Volatiles were removed and the grease was examined by infrared. A conversion to anhydride of greater than 90% was achieved. The product was a clear grease possessing a pungent odor.

Example 3.—Ethylene-propylene-acrylic butyric anhydride

A 34 g. portion of the precursor polymer employed in Example 2 and 50 ml. of butyric anhydride were combined in a 100 ml. round bottomed flask fitted with a reflux condenser with drying tube. The mixture was refluxed for 3 hours at 198–200° C. The mixture was then cooled, diluted to 500 ml. with dry acetone, and the liquids were drained off. The grease was rinsed with 50 ml. of acetone. The residual acetone was removed from the product by evaporation in a stream of dry air. Analysis of the product was conducted by infrared, and a quantitative conversion was found. The product was a lemon yellow colored grease (almost an oil) with a sharp butyric acid odor when exposed to damp air.

Example 4.—Ethylene-acrylic acetic anhydride

A 5.0 g. portion of the precursor polymer employed in Example 1 was placed in a solution containing 15 ml. of toluene and 15 ml. of acetic anhydride. The mixture was allowed to react 48 hours at ambient conditions (26° C., atmospheric pressure) in a one-neck flask fitted with a drying tube. The polymer was precipitated in ethanol, the ethanol decanted, and the remaining volatiles stripped under reduced pressure. Infrared analysis showed a 40% conversion of the acid polymer to anhydride.

Example 5.—Formation of coatings

A set of 1″ x 1″ samples of aluminum and copper foils are degreased with trichloroethane. They are then dipped into a trichloroethane solution of the anhydride-containing polymer of Example 1 (3% by weight). The solvent is then evaporated under a heat lamp to deposit a polymer film on the samples. The coated samples are then heat cured for 3 minutes at about 136° C. to complete the cross-linking of the polymer.

Next the treated samples are contacted with concentrated HCl (38%), and with 5 N HCl. The resistance of the metals to the acids is greatly improved. The film, which is transparent, is also solvent resistant.

It is to be understood that the other precursor polymers, anhydrides and solvents taught herein, even though not exemplified above, will give results similar to the above.

We claim:

1. A method for producing a polyalkylene copolymer which contains one or more groups of the formula

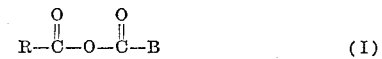

(I)

wherein R is an alkyl, cycloalkyl, aryl, aralkyl or alkaryl group of up to 20 carbon atoms, and B is a segment of the polyalkylene chain, the method comprising contacting a 1.0 to about 80 weight percent solution of an olefin-carboxylic acid copolymer containing at least one group of the formula

(II)

wherein B is as defined above, with at least about 1 equivalent of an acid anhydride of the formula

(III)

wherein each R is, independently, as defined above, per polymeric acid equivalent at a temperature of from about 10° C. to the boiling point of the acid anhydride.

2. The process of claim 1 wherein the polymer has a concentration in the solution of from about 20 to 60 weight percent.

3. The process of claim 1 wherein from about 3 to 12 anhydride equivalents are utilized per acid equivalent.

4. The process of claim 1 wherein the reaction temperature is suitable to maintain reflux conditions.

5. The process of claim 1 wherein R is methyl, ethyl, propyl, butyl or phenyl.

References Cited

UNITED STATES PATENTS

| 3,523,930 | 8/1970 | Maloney | 260—80.8 |
| 3,548,408 | 12/1970 | Worrall | 260—78.4 |

JOSEPH L. SCHOFER, Primary Examiner

J. KIGHT, Assistant Examiner

U.S. Cl. X.R.

117—161 UT; 260—78.5 T, 80.8